(12) United States Patent
Bauer et al.

(10) Patent No.: US 9,097,164 B2
(45) Date of Patent: Aug. 4, 2015

(54) DEVICE FOR PROVIDING A LIQUID REDUCING AGENT HAVING A TANK WITH A TEMPERATURE SENSOR AND MOTOR VEHICLE HAVING THE DEVICE

(71) Applicant: EMITEC GESELLSCHAFT FÜR EMISSIONSTECHNOLOGIE MBH, Lohmar (DE)

(72) Inventors: Peter Bauer, Siegburg (DE); Jan Hodgson, Troisdorf (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 101 days.

(21) Appl. No.: 13/854,358

(22) Filed: Apr. 1, 2013

(65) Prior Publication Data
US 2013/0327026 A1 Dec. 12, 2013

Related U.S. Application Data

(63) Continuation of application No. PCT/EP2011/066822, filed on Sep. 28, 2011.

(30) Foreign Application Priority Data

Oct. 1, 2010 (DE) .......................... 10 2010 047 277

(51) Int. Cl.
| | |
|---|---|
| *F01N 3/00* | (2006.01) |
| *F01N 3/10* | (2006.01) |
| *B65D 6/00* | (2006.01) |
| *B65D 8/00* | (2006.01) |
| *B60P 3/00* | (2006.01) |
| *B62D 33/00* | (2006.01) |
| *B65D 88/12* | (2006.01) |
| *F01N 3/24* | (2006.01) |

(Continued)

(52) U.S. Cl.
CPC ................ *F01N 3/24* (2013.01); *F01N 3/2066* (2013.01); *F01N 13/16* (2013.01); *F01N 2530/18* (2013.01); *F01N 2560/06* (2013.01); *F01N 2610/1406* (2013.01); *Y02T 10/24* (2013.01)

(58) Field of Classification Search
USPC ............ 60/286, 295, 301, 303; 220/4.13, 562
See application file for complete search history.

(56) References Cited

U.S. PATENT DOCUMENTS

| | | | | |
|---|---|---|---|---|
| 4,818,845 | A * | 4/1989 | Koizumi et al. ............... | 392/462 |
| 8,429,900 | B2 | 4/2013 | Knetsch et al. | |
| 2003/0007790 | A1* | 1/2003 | Harris ........................... | 392/487 |

(Continued)

FOREIGN PATENT DOCUMENTS

| | | |
|---|---|---|
| DE | 19841770 A1 | 4/2000 |
| DE | 10319151 A1 | 11/2004 |

(Continued)

Primary Examiner — Audrey K Bradley
(74) Attorney, Agent, or Firm — Laurence A. Greenberg; Werner H. Stemer; Ralph E. Locher

(57) ABSTRACT

A device for providing liquid reducing agent includes a reducing-agent tank with a tank wall which delimits a tank interior. The tank wall has a metallic wall section and the device has a temperature sensor which is disposed outside the reducing-agent tank. The temperature sensor is configured to determine a temperature of the reducing agent in the reducing-agent tank through the metallic wall section. A motor vehicle having the device is also provided.

17 Claims, 2 Drawing Sheets

(51) Int. Cl.
*F01N 3/20* (2006.01)
*F01N 13/16* (2010.01)

(56) References Cited

U.S. PATENT DOCUMENTS

| | | | |
|---|---|---|---|
| 2005/0013596 A1* | 1/2005 | Bradenbaugh | 392/449 |
| 2009/0301067 A1* | 12/2009 | Dingle et al. | 60/286 |
| 2010/0050606 A1* | 3/2010 | Fulks et al. | 60/286 |
| 2010/0078426 A1 | 4/2010 | Li et al. | |
| 2010/0162690 A1* | 7/2010 | Hosaka et al. | 60/295 |
| 2011/0179776 A1* | 7/2011 | Magnusson et al. | 60/295 |
| 2012/0006832 A1 | 1/2012 | Krause et al. | |
| 2012/0225396 A1 | 9/2012 | Harr et al. | |
| 2012/0308455 A1 | 12/2012 | Maus et al. | |

FOREIGN PATENT DOCUMENTS

| | | | |
|---|---|---|---|
| DE | 102007016858 A1 | 10/2008 | |
| DE | 102008000549 A1 | 11/2008 | |
| DE | 102007027413 A1 | 12/2008 | |
| DE | 102009000101 A1 | 7/2010 | |
| DE | 102009041938 A1 | 3/2011 | |
| DE | 102010004613 A1 | 7/2011 | |
| EP | 1925354 | 5/2008 | |
| WO | 2008122460 A1 | 10/2008 | |
| WO | WO 2010015006 A1 * | 2/2010 | B60K 15/03 |

* cited by examiner

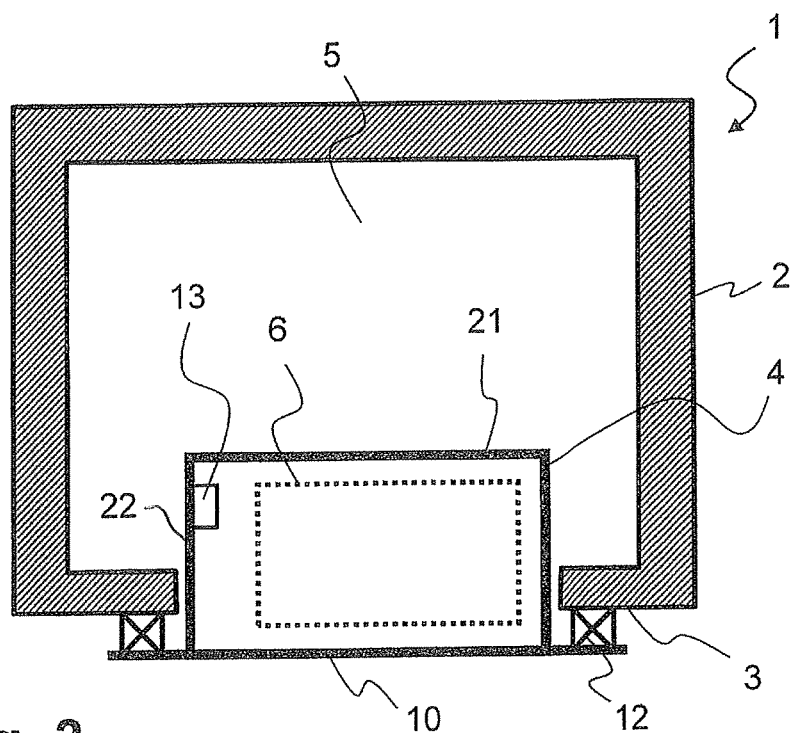
Fig. 3
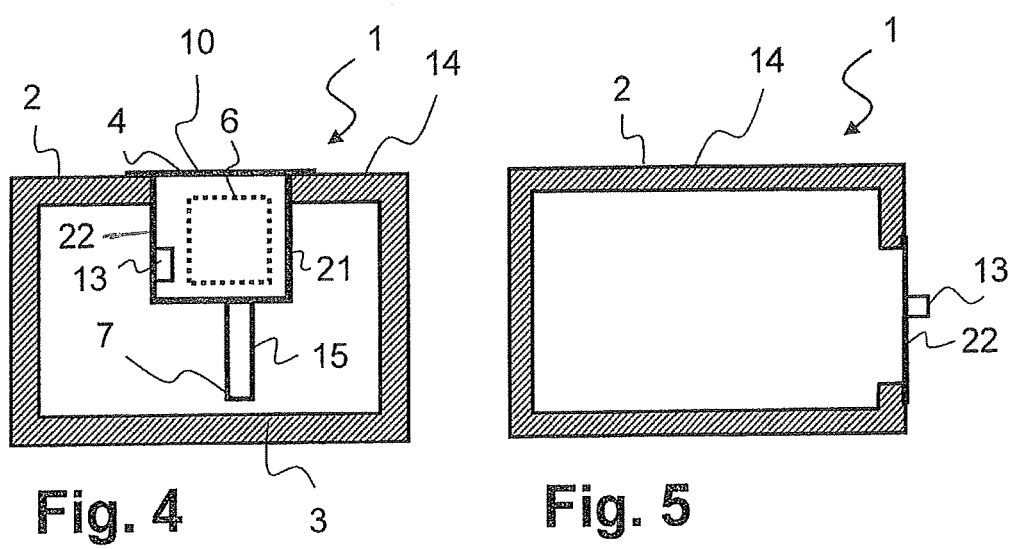
Fig. 4
Fig. 5

DEVICE FOR PROVIDING A LIQUID REDUCING AGENT HAVING A TANK WITH A TEMPERATURE SENSOR AND MOTOR VEHICLE HAVING THE DEVICE

CROSS-REFERENCE TO RELATED APPLICATION

This application is a continuation, under 35 U.S.C. §120, of copending International Application No. PCT/EP2011/066822, filed Sep. 28, 2011, which designated the United States; this application also claims the priority, under 35 U.S.C. §119, of German Patent Application DE 10 2010 047 277.8, filed Oct. 1, 2010; the prior applications are herewith incorporated by reference in their entirety.

BACKGROUND OF THE INVENTION

Field of the Invention

The present invention relates to a device for providing a liquid reducing agent, having a tank configuration with a metering system for a reducing agent. Through the use of such a device, a reducing agent for selective catalytic reduction of exhaust gas constituents in the exhaust gas of an internal combustion engine can be supplied at a defined or prespecified pressure. The reducing agent provided with a desired pressure can, for example, be supplied by an injector to an exhaust gas treatment system for the selective catalytic reduction (SCR) process. The invention also relates to a motor vehicle having the device.

In selective catalytic reduction (SCR), a reducing agent or reducing agent precursor is supplied to the exhaust gas in an exhaust gas treatment device. Reducing agent precursors are usually also known as reducing agents. Ammonia or the like are used, for example, as reducing agents. Urea and/or urea-water solution are used, for example, as a reducing agent precursor. A reducing agent precursor which is already proven is a 32.5% urea-water solution which is available commercially under the trademark AdBlue. Such reducing agent precursors are then converted into the actual reducing agent in the exhaust gas system and/or in an intermediate evaporator unit and/or hydrolysis unit. A urea-water solution is typically converted into ammonia. Then nitrogen oxide compounds in the exhaust gas can be converted together with the ammonia into harmless constituents such as nitrogen, water and carbon dioxide in a suitable catalytic converter.

A separate storage system and/or metering system is usually provided in the motor vehicle for the provision of reducing agent. Such a system can be associated with substantial costs. It is also a problem for the storage of liquid reducing agent and, in particular, of AdBlue, that it freezes at low temperatures. AdBlue freezes at around −11° C. A system for storing such reducing agent must therefore be constructed to be frost-resistant. Therefore, it is advantageous if the temperature of the reducing agent is known. Normally temperature sensors are used to measure temperature. It has been found that temperature sensors can be damaged by the reducing agent.

SUMMARY OF THE INVENTION

It is accordingly an object of the invention to provide a device for providing a liquid reducing agent, having a tank with a temperature sensor, and a motor vehicle having the device, which overcome the hereinafore-mentioned disadvantages and at least partly solve the highlighted problems of the heretofore-known devices and vehicles of this general type. In particular, a device is specified for a particularly advantageous determination of a temperature in the reducing agent tank.

With the foregoing and other objects in view there is provided, in accordance with the invention, a device for providing liquid reducing agent. The device comprises a reducing agent tank with a tank wall delimiting a tank interior, the tank wall having a metallic wall segment, and a temperature sensor disposed outside the reducing agent tank, the temperature sensor being adapted or configured to determine a temperature of the reducing agent in the reducing agent tank through the metallic wall segment.

A temperature sensor which is disposed outside the reducing agent tank is basically not located in an interior of the reducing agent tank or in a region of the reducing agent tank which is filled with reducing agent. The interior of an insert extending into the reducing agent tank does not belong to the tank interior. Such an insert rather reduces the size of the tank interior.

In accordance with another particularly advantageous feature of the device of the invention, the metallic wall segment is formed by a metallic pot which extends into the tank interior. Such a pot preferably has a pot bottom and a pot wall which together delimit a pot interior. In addition, there is an opening lying opposite the pot bottom. The opening preferably points away from the tank interior and the pot bottom points towards the tank interior.

The temperature sensor is preferably disposed on the inside of the metallic pot and therefore outside the tank interior. Particularly preferably, the temperature sensor is mounted inside the metallic pot where the metallic pot protrudes far into the reducing agent tank. The temperature sensor is preferably not disposed in the immediate vicinity of an edge region of the pot or the opening of the pot. Preferably, the temperature sensor is located on the pot bottom or on a pot wall in the vicinity of the pot bottom. With this configuration, using the temperature sensor, the temperature of the reducing agent in the tank can be determined particularly precisely because disruptive influences on the temperature resulting from heat sources or heat sinks in the environment of the reducing agent tank have less influence on the temperature in the vicinity of the pot bottom than in the vicinity of the pot opening.

In accordance with a further particularly advantageous feature of the device for providing liquid reducing agent of the invention, the reducing agent tank forms a separate chamber which is disposed on a tank wall of the reducing agent tank.

In accordance with an added preferable feature of the device of the invention, the separate chamber is disposed in the tank bottom. In a further preferred embodiment the separate chamber is disposed in a side tank wall in the vicinity of the tank bottom. It is, however, also possible that the separate chamber is provided in the tank wall on a top side of the tank.

In accordance with an additional advantageous feature of the device of the invention, the temperature sensor is attached to the metallic wall segment. Particularly preferably, the temperature sensor is attached by material connection or fit to the metallic wall segment, for example by an adhesive process, a soldering or brazing process or a welding process. It is important to provide a contact with excellent thermal conductivity between the metallic wall segment and the temperature sensor. Then the temperature of the reducing agent in the tank can be determined particularly precisely.

In a further embodiment the temperature sensor is in heat-conductive contact with the pot wall through a heat-conduction agent. This heat-conduction agent should have a particularly high thermal conductivity. At the same time the metallic wall segment in the region of the temperature sensor, and where applicable any heat-conduction agent, which serve for heat-conductive connection between the metallic wall segment and the temperature sensor, should have as low a heat capacity as possible. This improves the reaction speed of the temperature sensor to temperature changes of the reducing agent because less time is required for the temperature of the heat-conductive connection to adapt to the temperature of the reducing agent in the reducing agent tank.

An important concept of the invention proposed herein is to provide the metering unit in the pot or in the separate chamber. The temperature sensor is then located in the immediate vicinity of the metering unit. Thus, measurement data from the temperature sensor can be processed particularly advantageously.

In accordance with yet another feature of the device of the invention, the metering unit includes at least one component from the following group of components:

a pump;
a filter;
a pressure sensor;
a temperature sensor; or
a valve.

The metering unit preferably contains all components necessary to be able to provide the reducing agent under a defined pressure, but in any case at least one pump. Further pumps, valves, pressure sensors, temperature sensors and/or filters can be provided together with electronic components, connecting lines, etc.

These individual components are preferably mounted on a base plate. The base plate is preferably metallic. For example, the base plate can be made of a stainless steel or aluminum. At least one channel can be provided in the base plate which interconnects the individual components for transport or delivery of reducing agent. The channels (which are disposed in series or in parallel) can, for example, be bored into the base plate. The base plate can be produced as a casting already containing these channels. The base plate can effectively distribute heat between the individual components of the device according to the invention. Therefore, aluminum is particularly advantageous as a material for the base plate. Aluminum has an excellent ratio of thermal conductivity to weight.

In accordance with a further feature of the device of the invention, the tank wall is mainly made of plastic and the metallic wall segment is inserted non-detachably in the tank wall. If the reducing agent tank is a plastic injection molding, the metallic wall segment is preferably molded into the tank wall. The metallic wall segment can, however, also be welded or cast into the tank wall. The metallic wall segment is advantageously cast in place if the tank is a casting. A welded metallic wall segment is then particularly suitable if the plastic material constituting a reducing agent tank made of plastic is already hardened at the time of insertion of the metallic wall segment. Then a metallic wall segment can no longer be molded or cast in place. It is, however, possible to partially remelt the plastic material in the context of a welding process in order to connect a metallic wall segment non-detachably with the plastic material of the tank wall.

The tank wall and the metallic wall segment can be connected together by form-locking and/or material connection. In order to improve the connection, the metallic wall segment at least in regions can have a special, for example roughened, surface. A form-locking connection is one which connects two elements together due to the shape of the elements themselves, as opposed to a force-locking connection, which locks the elements together by force external to the elements.

In a refinement of the device according to the invention, an O-ring is provided as a seal on the pot molded into the tank bottom.

It is furthermore advantageous if the tank bottom has a main plane and the separate chamber is disposed above the main plane. The main plane usually means a flat area, in which or directly next to which the majority of the tank bottom is disposed and up to which the tank interior extends at least in part. If the separate chamber is disposed above this main plane, the tank bottom has no or only a few partial regions protruding down beyond this main plane, so that the dimensions of the reducing agent tank are substantially decisive for the dimensions of the device. An extraction point of the metering unit for the reducing agent should also be disposed in the vicinity of the main plane so that the reducing agent tank can be evacuated as fully as possible in operation.

With the objects of the invention in view, there is concomitantly provided a motor vehicle, comprising an internal combustion engine, an exhaust gas treatment system, an injector for reducing agent and a device according to the invention, the injector being connected with the device by a reducing agent line.

Other features which are considered as characteristic for the invention are set forth in the appended claims, noting that the individual features listed in the dependent claims can be combined with each other in any arbitrary, technologically sensible manner and constitute further embodiments of the invention.

Although the invention is illustrated and described herein as embodied in a device for providing a liquid reducing agent, having a tank with a temperature sensor, and a motor vehicle having the device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, noting that the structural features shown in the figures can also be combined individually with the features of the claims and the remaining description.

BRIEF DESCRIPTION OF THE SEVERAL VIEWS OF THE DRAWING

FIG. 3 is a vertical-sectional view of a second embodiment variant of the device according to the invention;

FIG. 4 is a reduced, vertical-sectional view of a third embodiment variant of the device according to the invention; and FIG. 5 is a vertical-sectional view of a fourth embodiment variant of the device according to the invention.

DETAILED DESCRIPTION OF THE INVENTION

Figure 1:
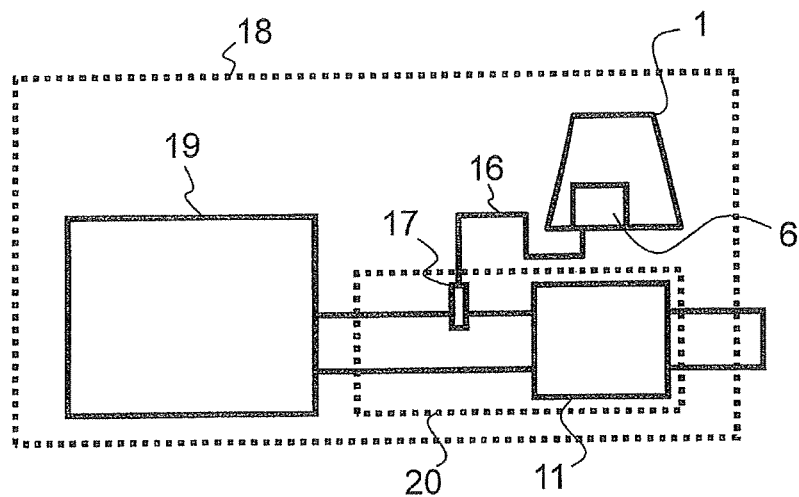
FIG. 1 is a block diagram of a motor vehicle with a device according to the invention.

Referring now in detail to the figures of the drawings, which show particularly preferred embodiment examples to which the invention is not restricted and in which the figures and particularly size ratios are merely diagrammatic, and first, particularly, to FIG. 1 thereof, there is seen a motor vehicle 18 having an internal combustion engine 19 and an exhaust gas treatment system 20. An SCR catalytic converter 11 is disposed in the exhaust gas treatment system 20. Liquid reducing agent from a device 1 according to the invention with a metering unit 6 is provided to the exhaust gas treatment system 20 through an injector 17. The device 1 according to the invention and the injector 17 are interconnected through a reducing agent line 16.

Figure 2:
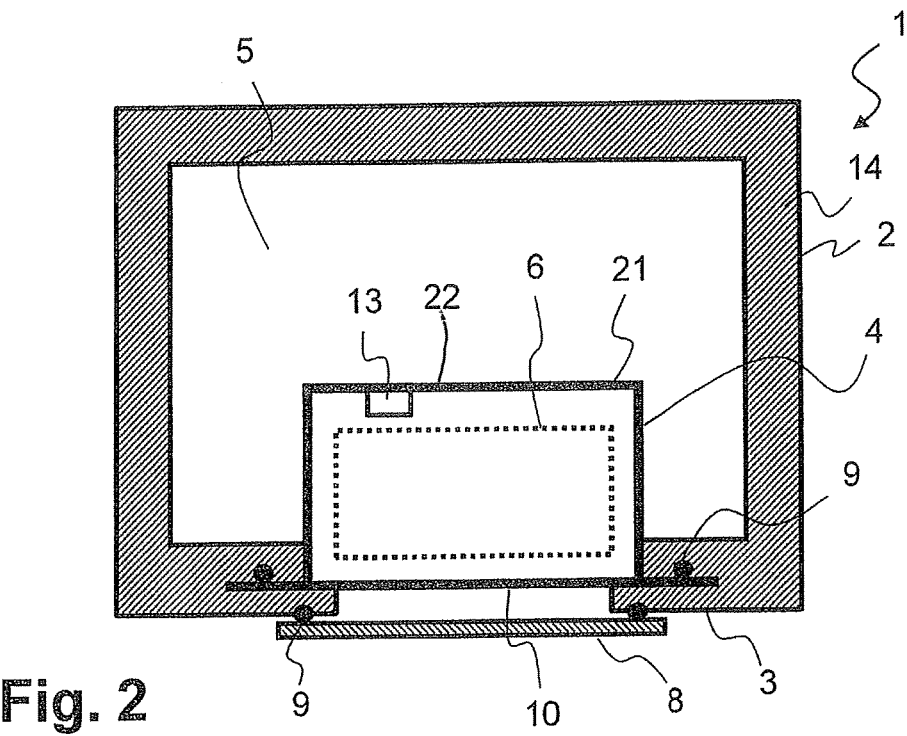
FIG. 2 is an enlarged, vertical-sectional view of a first embodiment variant of the device according to the invention.

FIG. 2 shows a first embodiment variant of the device 1 according to the invention in a greatly simplified illustration, in which a separate chamber 4 is constructed as a metallic pot 10 that is non-detachably connected with a tank bottom 3 of a reducing agent tank 2. The pot 10 forms a metallic wall segment 22. The pot 10 is preferably molded, cast or welded into the tank bottom 3 of the reducing agent tank 2 or a tank wall 14 of the reducing agent tank 2 in the region of the tank bottom 3. The reducing agent tank 2 in this case is preferably made of plastic. In this embodiment variant the metering unit 6, which is indicated herein by dotted lines as a box, is also provided in the separate chamber 4. The pot 10 can be closed by a cover 8. The pot 10 and the tank bottom 3 can be sealed to each other by molded O-rings 9, so that in this case no leakage of reducing agent is possible from a tank interior 5 through the tank bottom 3 along the pot 10. In the region of the pot 10, O-rings can also be molded in or on the tank bottom 3 which allow the cover 8 to be sealed to the tank bottom 3. According to FIG. 2 a temperature sensor 13 is attached to the inside of a pot wall 21 of the pot 10. The temperature sensor 13 is attached there, preferably by a material connection. It can, for example, be glued, soldered, brazed or welded in place.

FIG. 3 shows a further embodiment variant of the device according to the invention in which the separate chamber 4 can be removed from the tank bottom 3 of the reducing agent tank 2. The separate chamber 4 in this case is also constructed as a pot 10. According to FIG. 3 as well, the pot 10 forms the metallic wall segment 22. The separate chamber 4 or pot 10 is fixed to or attached in the tank bottom 3 with a closure 12. The closure 12 also allows a secure seal of the tank interior 5. In this embodiment variant too, the metering unit 6 is provided in the separate chamber 4 and indicated therein as a box with dotted lines. FIG. 3 also shows that a temperature sensor 13 is provided in the interior of the pot 10 and attached to the inside of the pot wall 21.

The metallic pot 10 has excellent thermal conductivity. Therefore, the temperature of the reducing agent present in the reducing agent tank 2 can be measured indirectly by using the temperature sensor 13. The reducing agent is in contact with the metallic pot 10 over a large area, so that the temperature can also be measured precisely from the interior of the pot 10. The temperature sensor 13 according to FIG. 3 is attached to the inside of the pot wall 21, preferably by a material connection. It can, for example, be glued, soldered, brazed or welded in place.

FIG. 4 shows a further embodiment variant of the device 1 according to the invention. According to FIG. 4, the separate chamber 4 formed as a pot 10 with the metering unit 6, is disposed in the tank wall 14 on the top of the reducing agent tank 2 and forms the metallic wall segment 22 there. According to FIG. 4, an extraction tube 15 is provided in order to bridge a distance between an extraction point 7 and the separate chamber 4. A temperature sensor 13 is attached to the metallic wall segment 22 in the separate chamber 4. This temperature sensor 13 can, for example, be glued, soldered, brazed or welded in place.

FIG. 5 shows a fourth embodiment variant of the device 1 according to the invention in which the metallic wall segment 22 of the tank wall 14 is planar and does not form a separate chamber. In this embodiment variant too, a temperature sensor 13 is attached on the outside of the metallic wall segment 22.

The invention claimed is:

1. A device for providing liquid reducing agent to an exhaust gas treatment system in a motor vehicle, the device comprising:
   a reducing agent tank having a tank interior and a tank wall delimiting said tank interior, said tank wall having a metallic wall segment;
   an injector for delivering the liquid reducing agent from said reducing agent tank into the exhaust gas treatment system; and
   a temperature sensor disposed outside said reducing agent tank, said temperature sensor configured to determine a temperature of the reducing agent in said reducing agent tank through said metallic wall segment.

2. The device according to claim 1, which further comprises a metering unit for removing the reducing agent from said tank, said metering unit including at least one component selected from the following group of components:
   a pump;
   a filter;
   a pressure sensor; and
   a valve.

3. The device according to claim 1, wherein said tank wall of said reducing agent tank is formed of plastic and said metallic wall segment is non-detachably inserted in said tank wall.

4. The device according to claim 1, wherein said reducing agent tank is an injection molded tank and said metallic wall segment is molded into said tank wall.

5. The device according to claim 1, wherein said metallic wall segment is welded into said tank wall.

6. The device according to claim 1, wherein said metallic wall segment is cast into said tank wall.

7. The device according to claim 1, wherein said metallic wall segment is connected to said tank wall by a form-locking connection.

8. The device according to claim 1, wherein said metallic wall segment is connected to said tank wall by a material connection.

9. The device according to claim 1, wherein said metallic wall segment has at least in regions a roughened surface.

10. The device according to claim 1, wherein the liquid reducing agent in the tank and said temperature sensor both have direct contact to said metallic wall segment.

11. The device according to claim 1, wherein said metallic wall segment is formed by a metallic pot extending into said tank interior.

12. The device according to claim 11, wherein said metallic pot forms a separate chamber disposed on said tank wall of said reducing agent tank.

13. The device according to claim 12, wherein said reducing agent tank has a tank bottom and said separate chamber is disposed in said tank bottom.

14. The device according to claim 12, further comprising a metering unit disposed in said separate chamber.

15. A motor vehicle, comprising:
   an internal combustion engine;
   a device according to claim 1;
   the exhaust gas treatment system receiving exhaust gas from said internal combustion engine; and a reducing agent line connecting said injector to said device.

16. A device for providing liquid reducing agent to an exhaust gas treatment system in a motor vehicle, the device comprising:
- a reducing agent tank having a tank interior and a tank wall delimiting said tank interior, said tank wall having a metallic wall segment;
- an injector for delivering the liquid reducing agent from said reducing agent tank into the exhaust gas treatment system; and
- a temperature sensor disposed outside said reducing agent tank, said temperature sensor being attached to said metallic wall segment, said temperature sensor configured to determine a temperature of the reducing agent in said reducing agent tank through said metallic wall segment.

17. The device according to claim 16, wherein said temperature sensor is attached by a material connection to said metallic wall segment.

* * * * *